United States Patent [19]
Wendling

[11] B 3,914,566
[45] Oct. 21, 1975

[54] TURN SIGNAL AND HAZARD WARNING SWITCH

[75] Inventor: John E. Wendling, Fort Wayne, Ind.

[73] Assignee: International Harvester Company, Chicago, Ill.

[22] Filed: Jan. 12, 1973

[21] Appl. No.: 323,191

[44] Published under the Trial Voluntary Protest Program on January 28, 1975 as document no. B 323,191.

[52] U.S. Cl. ........ 200/61.27; 200/61.3; 200/61.34; 200/61.35; 200/61.54
[51] Int. Cl.² .......................................... H01H 3/16
[58] Field of Search........... 200/61.27, 61.38, 61.54, 200/61.57, 16 C

[56] References Cited
UNITED STATES PATENTS

| | | | |
|---|---|---|---|
| 2,276,413 | 3/1942 | Moore | 200/61.34 |
| 2,678,358 | 5/1954 | Thomson | 200/61.35 |
| 2,817,728 | 12/1957 | Gurney | 200/61.27 X |
| 3,029,320 | 4/1962 | Laete | 200/16 C |
| 3,030,459 | 4/1962 | Elliott et al. | 200/16 C X |
| 3,300,601 | 1/1967 | Du Rocher et al. | 200/61.34 |
| 3,510,839 | 5/1970 | Elliott et al. | 200/61.27 X |
| 3,604,867 | 9/1971 | Suzuki | 200/61.34 |

Primary Examiner—James R. Scott
Attorney, Agent, or Firm—Frederick J. Krubel; Floyd B. Harman

[57] ABSTRACT

A steering column mounted turn signal and hazard warning switch for use in connection with a vehicle including a non-metallic casing mounted exteriorly of the steering column and wherein a single actuating lever is employed to activate both the turn signal indications and the hazard warning indication; the switch is conditionable by selectively orienting a pair of cancelling pawls so that in one position they are operatively engageable by a steering wheel carried cancelling pin and in a second position they are incapable of being operatively engaged by the cancelling pin so that turn signal indications are optionally manually as well as automatically cancellable or manually cancellable only; the hazard signal indication is manually cancellable or cancellable automatically by operation of the lever to a turn signal mode regardless of the orientation of the cancelling pawls.

12 Claims, 13 Drawing Figures

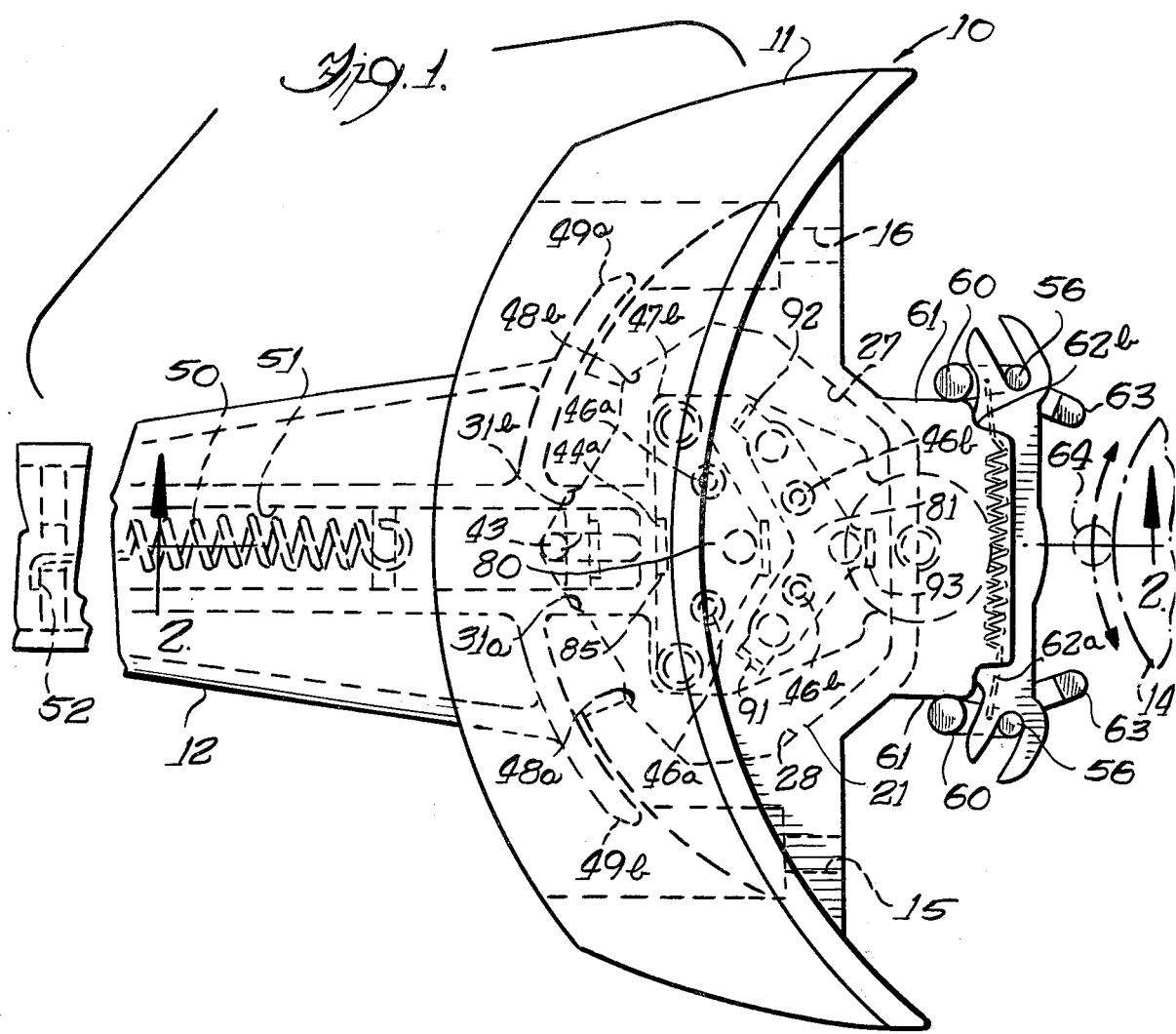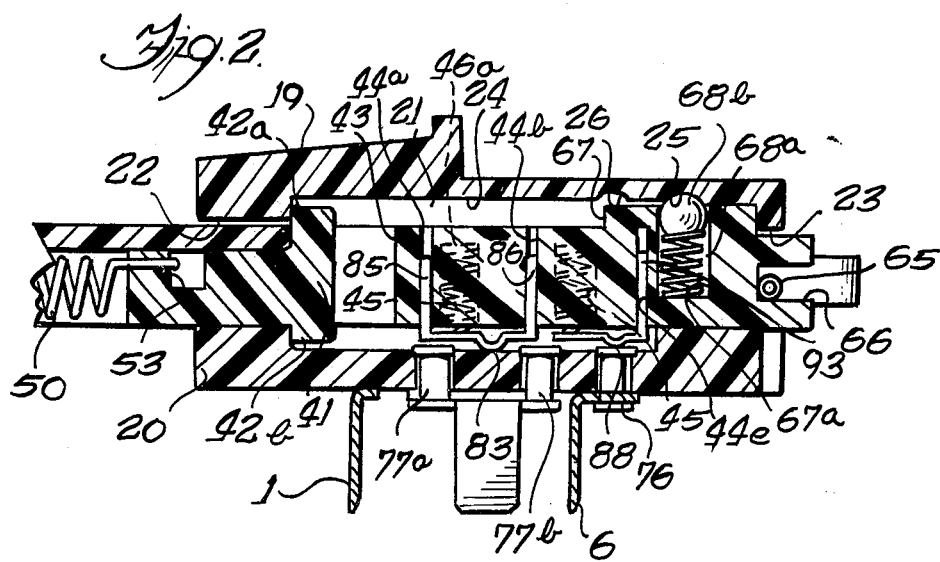

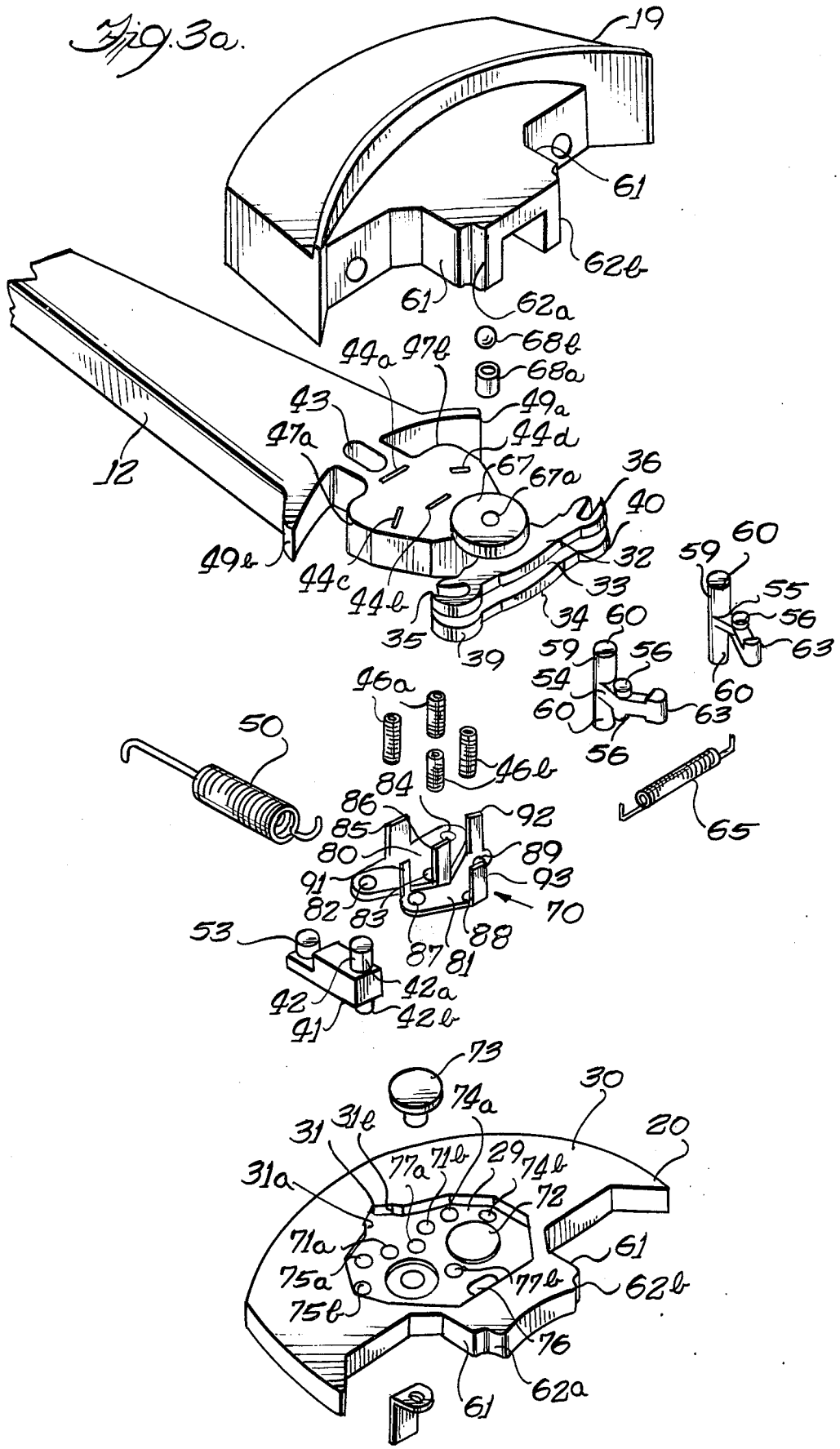

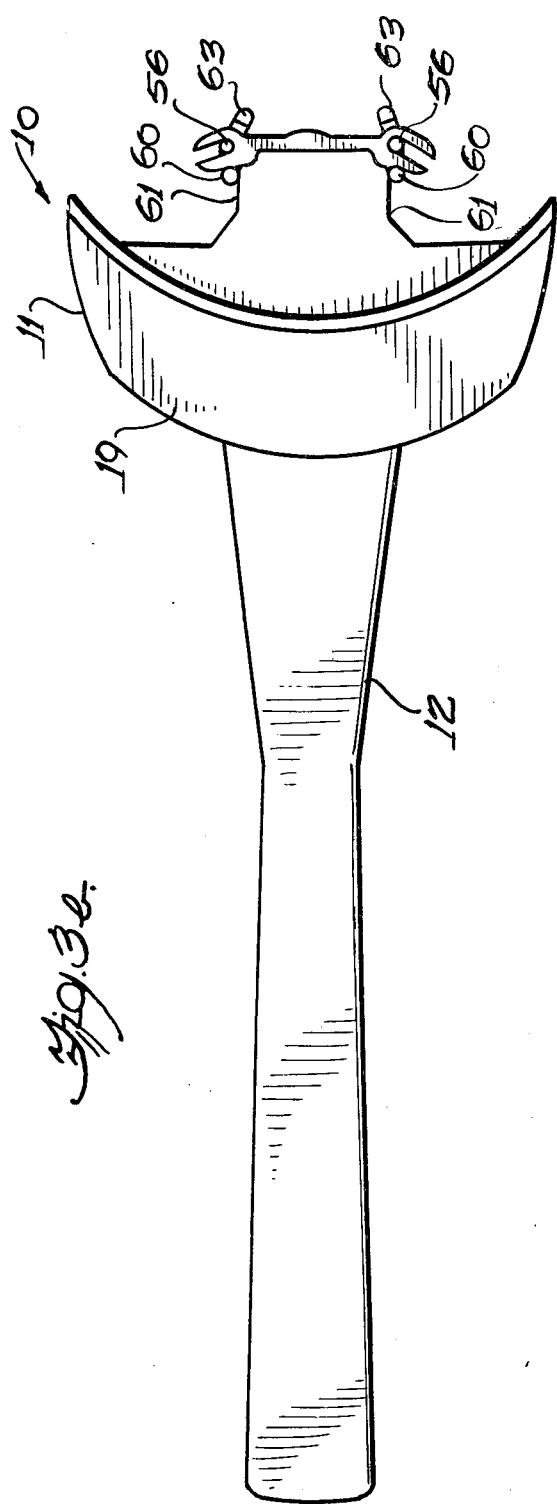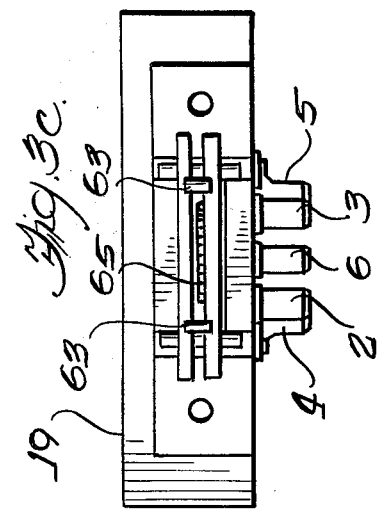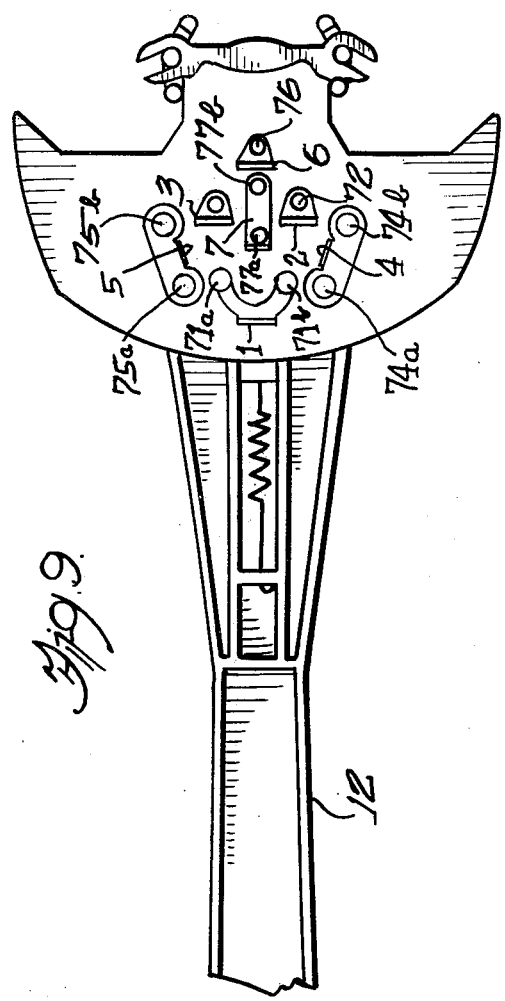

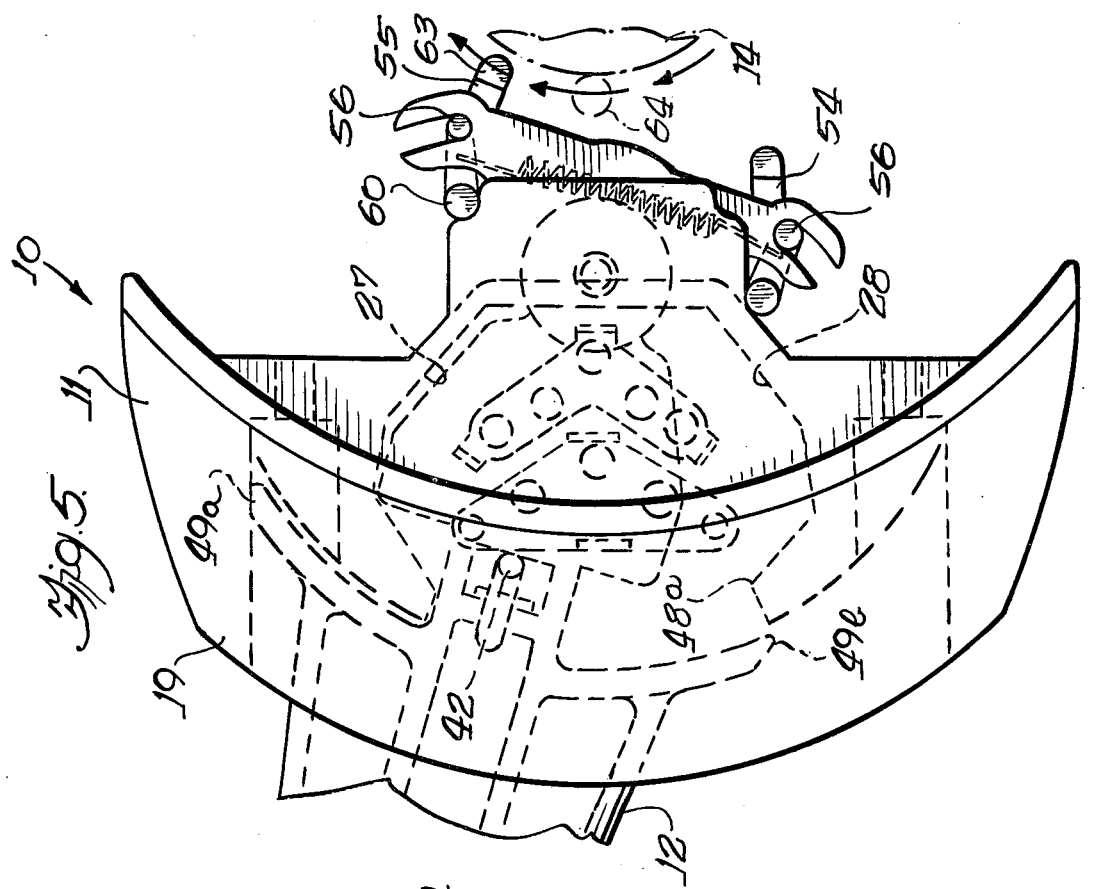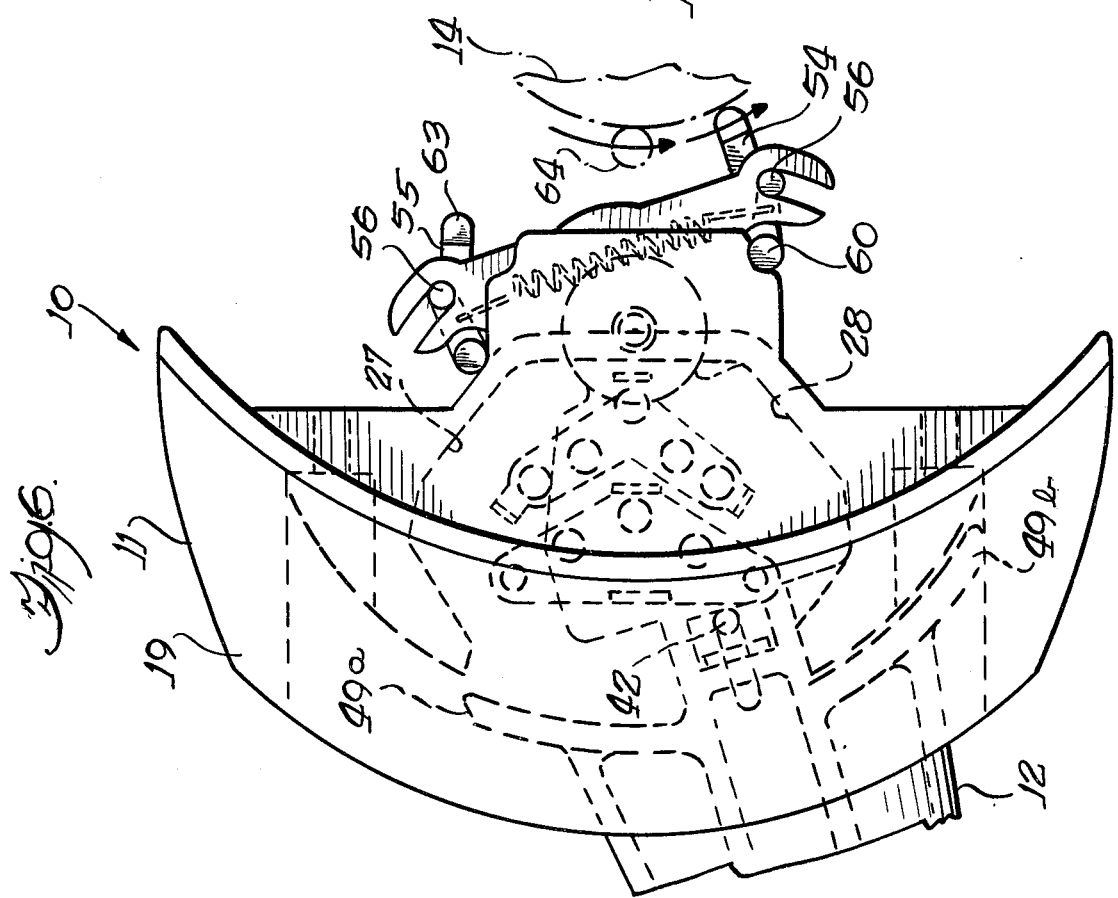

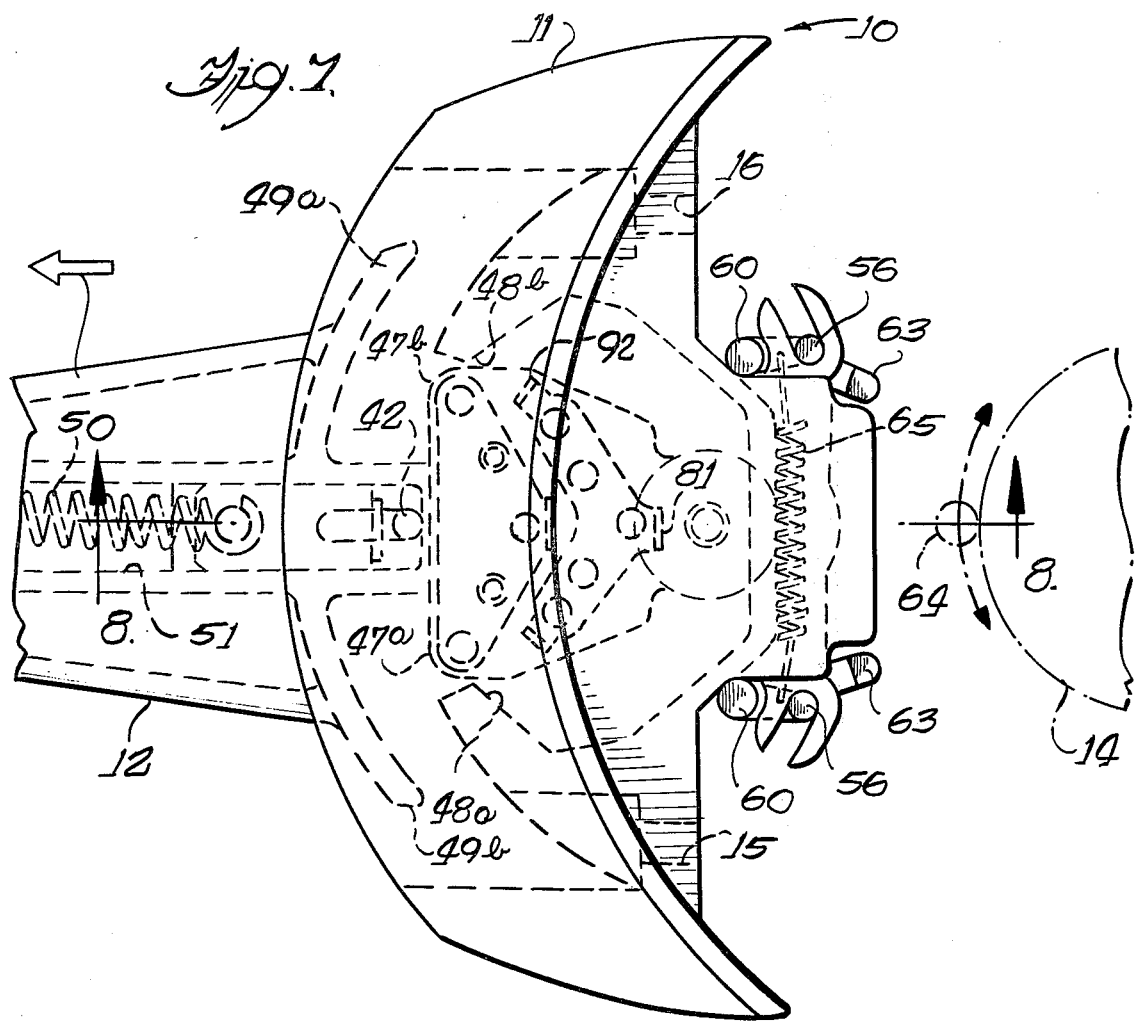
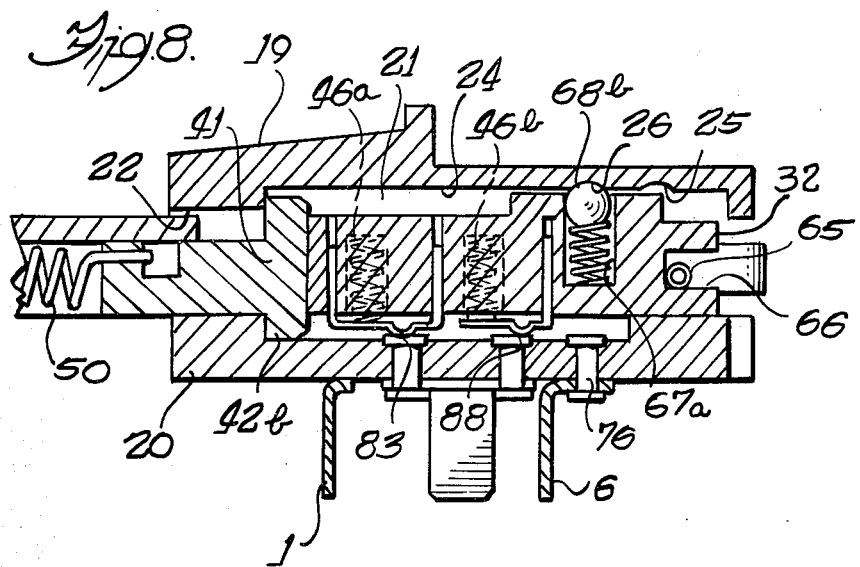

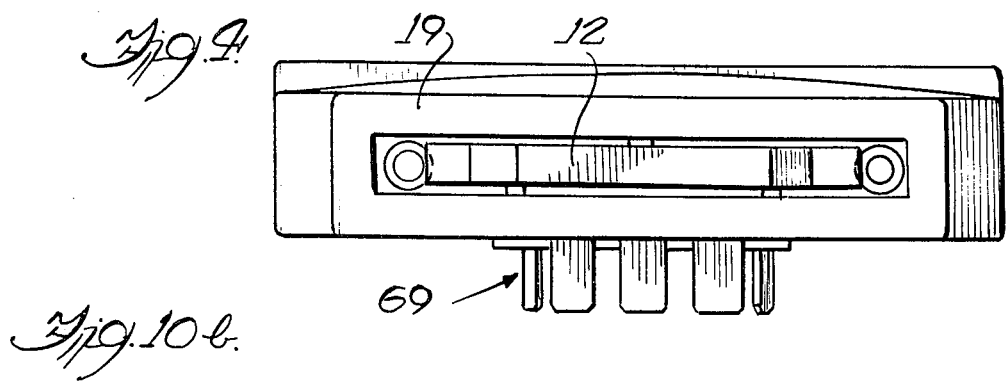
Fig. 9
Fig. 10b.
| POSITION | CIRCUIT CLOSED | | CIRCUIT OPEN | | |
|---|---|---|---|---|---|
| NORMAL | 2-3-6 | | 1 | 4 5 | 7 |
| LT. TURN OR LANE CHANGE | 1-3-5 | 2-6 | | 4 | 7 |
| RT. TURN OR LANE CHANGE | 1-2-4 | 3-6 | | 5 | 7 |
| HAZARD | 2-3-4-5-7 | | 1 | | 6 |
Fig. 10a.
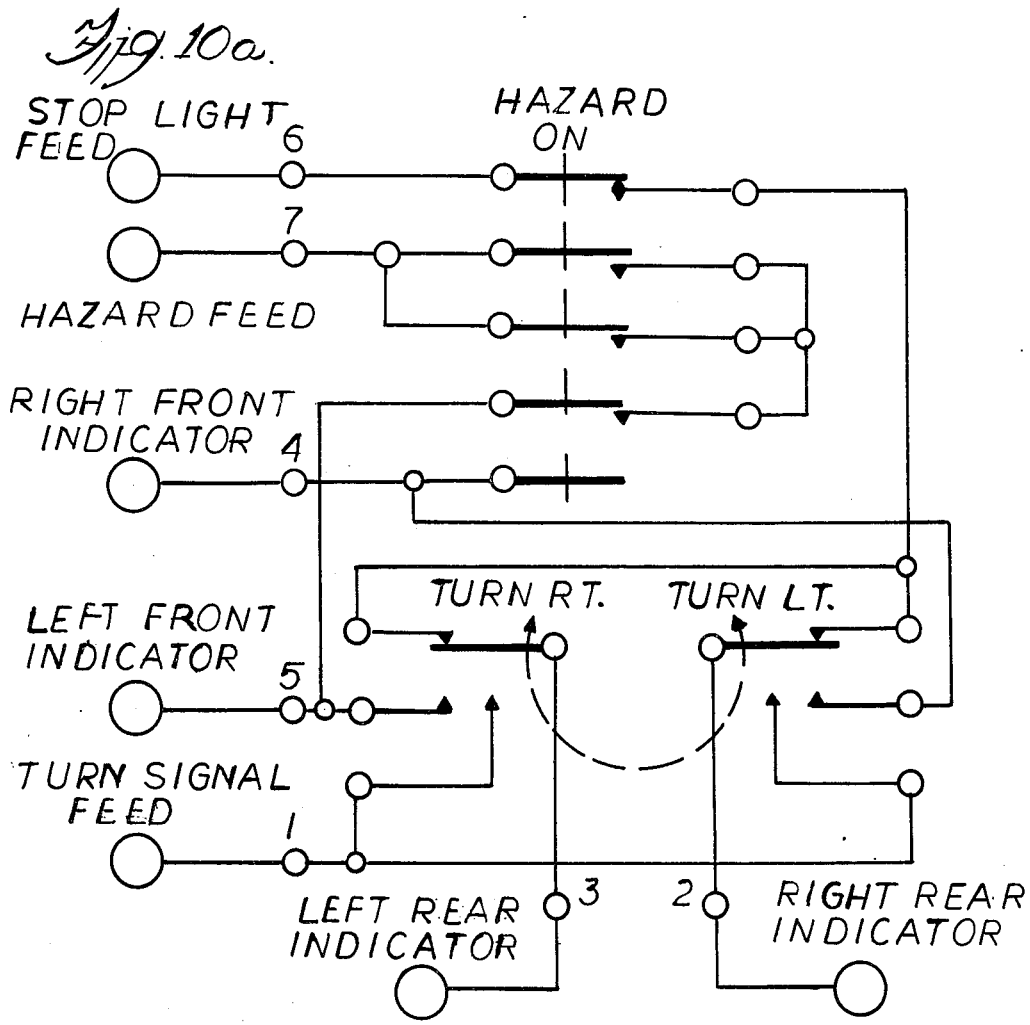

TURN SIGNAL AND HAZARD WARNING SWITCH

This invention relates to a combination turn signal and hazard warning switch arrangement for use in connection with a vehicle.

SUMMARY OF THE INVENTION

Briefly summarized, the device herein is a unitary switch device which includes both a turn signal and hazard warning electrical switch coupled with a stop light switch wherein a single lever is adapted to activate either turn signal indicator lights or hazard warning indicator lights at both the front and rear of the vehicle such, for example, as an automotive vehicle. The device provides for both manual and self-cancellation of the turn signal or optionally for manual cancellation only of the turn signal and cancellation of the hazard signal by operation of the lever to the OFF position, to a lane change or turn signal position. The switch also provides a unique arrangement whereby a minimum number of electrical contacts are required for completing each circuit thus allowing the switch to function under high lamp loads.

A principal object of this invention is to provide a combination turn signal and hazard warning switch arrangement which includes a minimum number of parts and is easy to manufacture.

Another object of this invention is to provide a combination turn signal and hazard warning switch arrangement which may be mounted externally of the steering column of the vehicle and may be easily removed without the necessity of removing any other steering column associated parts.

A further object is to provide an externally mounted steering column turn signal and hazard warning switch arrangement which has a positive self cancellable turn signal feature.

Another object is to provide in a device of the type herein described a hazard warning switch which is cancellable when the turn signal is activated or is manually cancellable.

Another object is to provide an arrangement whereby cancelling pawls are effective to releasably lock the turn signal switch in either of two selectable turn positions.

Another object is to provide a turn signal and hazard warning switch arrangement which is easily convertible from one having an automatic and manually cancellable turn signal feature to one in which the turn signal feature is manually cancellable only and vice versa.

A still further object is to provide in the switch arrangement of the type herein described a minimum number of electrical contact points through which current must pass to activate the desired signal indicators.

The foregoing and other objects will become more apparent when the accompanying description is read in connection with the following drawings in which:

DESCRIPTION OF THE DRAWINGS

FIG. 1 is an enlarged plan view of a portion of the turn signal and hazard switch arrangement embodying the invention herein;

FIG. 2 is a sectional view in elevation taken along the line 2—2 of FIG. 1;

FIG. 3a is an exploded view showing an arrangement of the parts included in the turn signal and hazard warning switch arrangement;

FIG. 3b is a plan view of the turn signal and hazard warning switch embodying the invention herein;

FIG. 3c is a right end view in elevation of the unit shown in FIG. 3b;

FIG. 4 is a left end view in elevation of the unit shown in FIGS. 1 and 2;

FIG. 5 is a plan view showing the switch arrangement of FIG. 1 activated to right turn indicating position;

FIG. 6 is a plan view showing the switch arrangement of FIG. 1 activated to left turn indicating position;

FIG. 7 is a plan view of the switch arrangement showing the switch in a hazard warning signal mode;

FIG. 8 is a sectional view in elevation taken along the line 8—8 of FIG. 7;

FIG. 9 is a plan view of the underside of the switch arrangement of FIG. 3b illustrating the position of various electrical terminals; and FIG. 10a and 10b are a circuit diagram showing the arrangement of switches together with a legend indicating the switches which are closed during various modes of operation.

DESCRIPTION OF THE PREFERRED EMBODIMENT

The turn signal and hazard warning switch device is designated generally by the numeral 10 and comprises a housing or casing 11, a switch actuating lever 12, and an electrical switch arrangement 13.

The casing 11 which preferably is formed of a hard plastic material may be attached to a steering column 14 (shown diagrammatically) of a vehicle by convenient means such as bolts extending through openings 15 and 16 in the casing and secured into a clamping member (not shown) disposed on the side of the steering column. It is to be understood that the steering column 14 supports the usual steering wheel (not shown) for rotational movement in a conventional manner. The casing 11 generally in the form of a curved structure may be formed of upper and lower portions 19 and 20 which in their assembled relation define therebetween a cavity 21 and openings 22 and 23 to and from the cavity 21 into which and through which the actuating lever 12 extends. The cavity 21 and openings 22 and 23 extend generally parallel to the casing as a whole. In the inner surface 24 of the upper portion 19 of the casing two recesses 25 and 26 are formed which function as part of a detent mechanism later to be described. The cavity 21 also defines a pair of shoulders 27 and 28 which act as limit stops for the lever 12 when the latter is moved to the turn signal positions.

A large recess 29 is formed in the inner surface 30 of the lower portion 20 of the casing. In the recess 29 there are disposed a number of fixed electrical contact members which are part of the switch arrangement. These extend through the casing and to the outside ends of these contact members are connected a plurality of electrical contact terminals to be later described in more detail. A centering notch 31 is formed in the wall of recess 29 to receive a centering pin for the lever 12.

The actuating lever 12 is a lever which can be selectively positioned in the casing 11 to indicate a right or left turn signal by rotating it within the cavity 21 of the casing. The lever 12 is made of an insulating material and preferably of a hard plastic material. It is cored in its handle portion to receive a tension spring and pivot block to be further described. At the inner end of the actuating lever cross bar means 32 in the form of a pair of cross bar portions 33 and 34 is attached to the end of the lever. Each end of each of the cross bars are formed with slots 35 and 36 extending normal to the plane of the lever. These slots each pivotally support therein a cancelling pawl as hereinafter will be further explained. Additional slots 39 and 40 are formed in the ends of the cross bars parallel to the plane of the lever 12. The lever 12 is partially supported within the casing 11 by means of a centering block 41. The latter is formed with a centering pin 42, one end 42a of which extends into elongated slot 43 formed in the lever and extending normal to the plane of the lever. The end 42a abuts against a shoulder 43a formed on the underside of portion 19 of the casing 11. The other end 42b of the centering pin extends into centering notch 31 formed in the lower portion 20 of the casing. The lever is formed with a plurality of vertically extending slots 44a, 44b, 44c, 44d and 44e for receiving therein portions of vertically movable switch contact members. The lever 12 also is formed with a plurality of bores 45 for housing therein respectively compression spring members 46a and 46b which the assembly engage the movable switch contact members. Outwardly extending projections 49a and 49b are formed on the lever 12. These projections are dust seals which protect the electrical contacts of the switch from contaminants.

A tension coil spring 50 is positioned within a slot 51 formed in the handle portion of the actuating lever. One end of the spring 50 is anchored to the lever at 52 about midway the length of the lever. The other end of the spring 50 is anchored to a pin 53 formed on the block 41 which is slidably disposed in the slot 51 of the lever handle. The lower end 42b of centering pin 42 is disposed in the centering notch 31 of lower portion 20 of the casing and the upper end 42a is disposed in the lever slot 43.

A pair of cancelling pawls 54 and 55 are assembled on each end of the cross bar means 32 of the actuating lever. Each pawl comprises a substantially T-shaped member, and may be referred to for convenience as a T-bar. Intermediate the ends of the vertical member of the T-bar a pair of pivot mountings 56 are formed which in the assembly are received in the slots 35 and 36 formed at the ends of the cross bars. The horizontal member 59 of the T-bar pawls has ends 60 which are adapted to rest on the outer surfaces 61 of casing 11 when the switch is in a normal or non-actuating position. The ends 60 are adapted to be received in the retaining notches 62 formed on the casing when the lever is rotated to either of two turn signal positions. The opposite end 63 of the cancelling pawls from the horizontal member 60 is adapted to be engaged by a cancelling pin 64 associated with the steering column. The cancelling pin 64 is suitably fixed to the steering wheel (not shown) so as to be movable in unison therewith in an arcuate path with respect to the stationary steering column 14 whenever the steering wheel is turned to steer the vehicle. In the assembly the pawls 54 and 55 are constrained and held in the cross bar portions by means of a tension spring member 65 disposed in groove or slot 66 formed in the end of the lever 12 and connected to each of the pawls.

The pawl arrangement provides an override feature. As shown in FIGS. 5 and 6 the pawl arrangement is such that with the switch in a turn indicating position when the steering wheel is turned to the left or right respectively the cancelling pin 64 will contact the end 63 of the pawl and swing it out of way against the tension of spring 65 without affecting the operation of the switch. When the cancelling pin has passed, the pawl merely falls back into position. This also occurs when the switch is held in a lane change position. Thus in either the lane change or turn signal position of the switch the override feature permits the cancelling pin to engage the pawl without damage.

The pawls are designed to be mounted in either one of two mounting positions. In a first mounting position they will provide for both automatic or manual cancelling. If they are mounted in a second mounting position (by being individually rotated 180° and reinstalled in the crossbar) they will provide for manual cancelling only since the pawls will not be positioned so as to be engageable by the cancelling pin 64. It will be observed that the vertical member of the T-bar pawls 54 and 55 is formed with two portions at an angle to each other so that the outer ends 63 thereof converge when mounted in an assembly as shown in FIG. 1. This allows the ends 63 to be placed in the path of the cancelling pin 64 for automatic cancelling after a turn has been made and the steering wheel returns to its normal position.

If the pawls 54 and 55 are removed and individually rotated 180° on their vertical axis and reinstalled in the cross bar 32 it is apparent that their outer ends will then diverge. In that position the ends of 63 will always be out of the path of the cancelling pin 64 so that automatic cancellation of a turn signal cannot be effected. Thus there is provided in this one switch device the advantageous feature of being able to have by a simple mechanical change either a switch with an automatic cancellation feature as one without the automatic cancellation feature. The latter feature is extremely important in vehicles which tow trailers in which case the vehicle operator must turn the steering wheel in both directions when negotiating a corner.

The top side of the actuating lever 12 is formed with a raised portion or boss 67 in which is formed a bore 67a. The bore 67a houses a compression spring 68a which together with a ball 68b is a portion of the detent mechanism for holding the lever 12 in either the normal (neutral) position or the hazard warning signal position within the casing 11. The ball 68b, of course, is received in either the recess 25 or 26 in these two positions. In the normal position the lever 12 pivots about the boss 67 and ball 68b.

The electrical switch arrangement 13 comprises stationary contact means 69 disposed in the lower portion 20 of the casing 11 and movable contact means 70 connected to the switch actuating lever 12.

The stationary contact means 69 includes a plurality of spaced electrical terminals 1 through 7 (see FIG. 9) connected to stationary electrical contact posts disposed in and extending through the lower portion 20 of the casing. Inasmuch as the casing 11 is made of electrically non-conductive material, as pointed out hereinbefore, the terminals 1 through 7 are electrically insulated from each other. Terminal 1 is connected to contact posts 71a and 71b, terminal 2 to contact post 72, terminal 3 to contact post 73, terminal 4 to contact posts 74a and 74b, terminal 5 to contact posts 75a and 75b, terminal 6 to contact post 76 and terminal 7 to contact posts 77a and 77b.

A cable and mating electrical plug which are connected to an electrical power source, are, in turn, connected to the terminals 1 through 7. A flasher unit (not shown) normally would be connected in the line between the electrical power source and the switch device 10.

The movable electrical contact means 70 comprises a pair of substantially triangular shaped electrically conductive contact plates 80 and 81 supported on the actuating lever 12 and insulated from each other. It will be appreciated that since the lever 12 is made of an electrically non-conductive material the contact plates 80 and 81 (being spaced with respect to each other) are electrically isolated from each other. The contact plate 80 is formed with three contact buttons 82, 83 and 84 on the underside of the plate and at the triangle corners. These buttons are adapted to engage certain of the stationary contact posts of the stationary contact means 69 depending on the position of the actuating lever 12. The contact plate 80 also is formed with a pair of vertically extending contact guide support bars 85 and 86 which in the assembly are slidably received in the slots 44a and 44b respectively in the lever 12. Thus the contact plate 80 which is normally urged downwardly, as seen, for example, in FIG. 2, under the influence of compression springs 46a is capable of upward and downward sliding movement on the guide support bars 85 and 86 as the movable contact members are moved laterally to different positions by the actuating lever.

The contact plate 81 also is formed with three contact buttons 87, 88 and 89 on the underside of the plate at the triangle corners. These buttons 87, 88 and 89 are also adapted to engage certain of the stationary contact posts of the stationary contact means 69 depending on the position of the actuating lever 12. The contact plate 81 is formed with three vertically extending guide support bars 91, 92 and 93 which in the assembly are received in slots 44c, 44d and 44e of the lever respectively. The contact plate 81 which is normally urged downwardly as seen in FIG. 2, under the influence of compression springs 46b also is capable of upward and downward sliding movement on the guide support bars as the movable contact members are moved laterally to different positions by the actuating lever. From the foregoing, it will be appreciated that the contact plates 80 and 81 are constrained to move in unison with the lever 12 during movement to and from its first, second and extended positions but are capable of relative vertical movement with respect thereto.

It will be appreciated that the contact plates 80 and 81 are easily assembled onto the lever thus greatly facilitating the manufacture.

The operation of the switch device will now be briefly described. In the views in FIGS. 1 and 2 the actuating lever is positioned in a normal or neutral position, i.e., one in which neither a turn signal nor a hazard warning signal is being given. In the neutral position, however, a stop light signal may be received and appropriately distributed. If the operator desires to make a lane change signal to move to a right lane, the lever 12 is rotated clockwise with a light force about the boss 67 and ball 68b. It is rotated until the end 42b of the centering pin strikes the ramp 31b which in effect acts as a stop. Additional force on the lever 12 is required to further rotate the lever to a turn signal position by moving 42b up the ramp. When the lever is released from a lane change position it automatically returns to a normal position in response to the force exerted by tension spring 50. In a right lane change position current will pass through terminals 1, 2 and 4 as indicated in the legend of FIG. 10b.

If a right turn signal is desired a slightly heavier force exerted on the lever 12 to rotate it somewhat further in a clockwise direction will be effective to permit the ends 60 of T-bar 55 to lodge in the notches 62b as shown in FIG. 5 under the influence of tension spring 65 interconnecting the cancelling pawls 54 and 55.

The actuating lever 12 will now remain in the right turn signal position until it is manually removed from that position by manually rotating the lever counterclockwise or automatically removed from that position by the action of the cancelling pin 64 attached to the steering wheel. In the automatic release the cancelling pin 64 which, during rotation of the steering wheel contacts the lower end 63 of the cancelling pawl 55 and lifts the pawl 55 out of the notches 62b by pivoting the pawl on the extensions 56 formed midway of the pawl. When this occurs the lever returns to a normal position under the influence of tension spring 50.

When the lever is positioned in a right turn indicating position, current also will pass through contacts 1, 2 and 4 as it does for a lane change position to the right and as indicated in the legend of FIG. 10b.

If the vehicle operator desires to indicate that he is making a lane change to the left he moves the lever 12 counterclockwise with a light force about the boss 67 and ball 68b, until 42b strikes ramp 31a. Upon release of the lever 12 it will automatically return to a normal or neutral position in response to the force exerted by tension spring 50. When the lever is being held in a position to indicate a lane change to the left current will pass through contacts 1, 3 and 5 as indicated in the legend of FIG. 10b.

If the vehicle operator wishes to make a left turn signal he moves the lever 12 downwardly, i.e., counterclockwise with enough force to permit the ends of T-bar pawl 54 to lodge in the notches 62a on the casing under the influence of tension spring 65 interconnecting the pawls. The actuating lever 12 will remain in this left turn indicating position until it is manually released from that position by manually rotating the lever clockwise or automatically released from the position by the action of the cancelling pin 64. During such automatic release, the cancelling pin during rotation of the steering wheel contacts the lower end 63 of the cancelling pawl 54 and lifts the pawl 54 out of notches 62a by pivoting the pawl 54 on the extensions 56 thereof formed midway of the pawl. When this occurs the lever returns to a normal position under the influence of tension spring 50.

When the lever 12 is placed in a left turn indicating position current will pass through contacts 1, 3 and 5 as indicated in the legend of FIG. 10b.

In the right turn position, for example, current will flow into terminal 1, contact post 71a, button 82, movable plate 80, button 83, contact post 72, and out terminal 2 to the right rear turn signal indicator light and to button 84, contact post 74b and out terminal 4 to the right front indicator light, thus passing through only two contact sets in activating either the right rear or right front turn signal on the vehicle. The same is true in making a left turn signal except that in this case the current will flow into terminal 1, contact post 71b, movable plate 80 and then through button 83, contact post 73 and out terminal 3 to the left rear indicator light and through button 82 and contact post 75b and out terminal 5 to the left front indicator light. In making either a right or left turn signal the rear turn signal indicator light for the side to which the turn is indicated is disconnected from the stop light feed leaving only the opposite side stop light function operable.

If the vehicle operator finds it necessary to turn on the hazard warning signal he merely pulls the lever 12 straight out from its normal or neutral position as shown in FIGS. 1 and 2 and moves it to an extended position shown in FIGS. 7 and 8. In moving to the position of FIGS. 7 and 8 the ball detent 68b is forced out of the recess 25 and falls into recess 26 thus holding the lever in the new position in opposition to the force of tension spring 50. The hazard warning switch may be released or cancelled by manually moving the lever back to the inoperative normal or (neutral) position of FIG. 1. It may also be cancelled automatically in a sense by moving the lever to a lane change or turn signal position. In moving the lever 12 to the hazard warning position the elongated slot 43 in the lever 12 permits the lever to be moved a predetermined distance along its longitudinal axis. In the hazard position the current passes through contacts 2, 3, 4, 5 and 7, as indicated in the legend of FIG. 10b.

When the hazard switch is cancelled by turning the lever either clockwise or counterclockwise to a lane change or turn signal position the shoulder 47a or 47b on the lever engages the abutment 48a or 48b respectively on the casing resulting in a force component directed along longitudinal axis of the lever 12 and toward the recess 25 sufficient to cause the ball 68b to be cammed into the bore 67a and out of the recess 26 against the biasing action of the spring 68a and thereby allowing the lever to be biased toward its normal or neutral position by the resilient action of the spring 50. Once the ball detent is released from its holding position shown in FIG. 8 the tension spring 50 is effective to bring the lever back to its normal or neutral position, shown in FIG. 2.

In the hazard warning indicating position current will flow into terminal 7, through contact post 77b to button 88 of movable plate 81 and thence to button 87, contact post 73 and terminal 3 to the left rear indicator light, to button 89, contact post 72 and terminal 2 to the right rear indicating light. Current also flows from terminal 7 through contact post 77a to button 83 and thence through movable plate 80 to button 82 through contact post 75a to terminal 5 to the left front indicating light and to button 84 through contact post 74a to terminal 4 to the right front indicating light. Here again in the hazard warning signal mode current passes through a minimum number of electrical contact sets, namely two, to activate any one of the front or rear indicator lights.

The stop light signal also is activated through movable plate 81. As indicated in the legend of FIG. 10b when the lever 12 is in its normal or neutral position that part of the electrical circuit which permits flow of current between terminals 2, 3 and 6 is closed, i.e., from the stop light feed from terminal 6 to the right and left rear indicating lights through terminals 2 and 3. That circuit, of course, may be activated by a switch or other means (not shown) which is controlled by the vehicle brake pedal. When the lever 12 is moved to a right turn signal position the circuit to terminal 2 is opened thus preventing stop light feed to terminal 2 and the right rear indicating light but allowing stop light feed to the left rear indicating light through terminals 6 and 3. When the lever 12 is moved to a left turn signal position the circuit to terminal 3 is opened thus preventing stop light feed to terminal 3 and the left rear indicating light but allowing stop light feed to the right rear indicating light through terminals 6 and 2. When the lever 12 is moved to a hazard warning position that circuit is open, the terminal 6 no longer being in electrical contact with button 88 of movable contact plate 81.

It will be apparent that I have advantageously provided a compact, easily installable switch device wherein a single lever operates both the turn signal and hazard warning indicating devices. In addition, the switch device is easily convertible from one having both automatic and manual cancelling features to one having manual cancellation only. Furthermore, a unique switch arrangement allows current to flow to complete each circuit while passing through only a minimum number of contacts.

While a preferred embodiment of the invention has been specifically disclosed, it is to be understood that the invention is not limited thereto as other variations will be apparent to those skilled in the art and the invention is to be given its fullest possible interpretation within the terms of the following claims.

What is claimed is:

1. In a turn signal and hazard warning electrical switch device for use in a vehicle having a stationary steering column and a steering wheel rotatably mounted on the steering column, the combination comprising:

a switch casing secured to said steering column;

means defining a cavity extending through said casing for receiving one end of a switch actuating lever therein;

a switch actuating lever extending into said cavity means and having an end portion disposed within said casing;

means pivotally mounting said actuating lever in said cavity means, said actuating lever being pivotal between first and second positions corresponding to left and right turn signal indicating positions, respectively;

spring means interconnecting said actuating lever and said casing for yieldably urging said actuating lever to a neutral position intermediate said first and second positions;

elongated cross bar means rigidly connected to said end portion of said actuating lever disposed within said casing, said cross bar means extending parallel to the plane of pivotal movement of said lever;

a pair of pawl members, each of said pawl members being pivotally mounted in a respective end of said cross bar means;

interengageable means on said casing and said pawl members to selectively hold said actuating lever in either one of said left and right turn signal indicating positions;

turn signal cancelling means carried by and movable in unison with the vehicle steering wheel;

means on said pawl members engageable by said turn signal cancelling means upon rotation of the vehicle steering wheel and when said actuating lever is in a left or right turn signal indicating position to release the actuating lever from such turn signal position and allow automatic return of the lever to said neutral position by said spring means.

2. The device of claim 1 wherein
said pawl members are removably mounted on said cross bar means and are selectively mountable in either of two selected positions whereby when mounted in one position they are engageable by said turn signal cancelling means to release the actuating lever from a turn signal position and when mounted in the other position they are not engageable by said turn signal cancelling means so that only manual cancellation of the turn signal is capable of being effected.

3. The device of claim 1 further including casing abutment means fixed to said casing and wherein
said two pawl members each comprise a T-bar pivotally mounted on the outer ends of said cross bar means, each of said T-bars including a vertical member and a horizontal member; and said interengageable means include means defining notches in said casing abutment means and horizontal members of said T-bar, the ends of said horizontal members being engageable in said notches.

4. The device of claim 1 including
spring biasing means for yieldably urging said interengageable means on each of said pawl members into engagement with said interengageable means on said casing.

5. The device of claim 4 wherein
said spring biasing means comprises a tension spring extending between and having each of its ends connected to a respective one of said pawl members.

6. The device of claim 1 wherein said actuating lever is further manually movable substantially along a straight line with respect to said switch casing between said neutral position and an extended position corresponding to a hazard warning indicating mode, said spring means being effective to yieldably urge said actuating lever toward said neutral position; and
detent means on said actuating lever and said casing, said detent means being effective to yieldably maintain said actuating lever in its extended position against the force of said spring means upon manual movement thereof from its neutral position.

7. The device of claim 6 including
abutment means on said casing projecting into said cavity means;
shoulder means on said lever to engage said abutment means when said lever is rotated while in its extended position to thereby effect release of said detent means and allow said spring to move said lever back to said neutral position and cancel said hazard warning indicating mode.

8. The device of claim 1 including
spring biased centering pin means associated with said actuating lever and stop means formed in said cavity means;
said centering pin means engaging said stop means to thereby define a pair of pre-established limits of rotational movement of said lever with respect to said casing within which such pre-established limits of rotation a lane change signal indication is effected, said lever being rotatable beyond each of said pre-established limits of rotation to effect a turn signal indication.

9. The device of claim 1 wherein said lever is made of electrically non-conductive material and including
stationary electrical switch contact means supported by said casing, said stationary electrical switch contact means being electrically connected to an electrical power source;
movable electrical switch contact means carried by said lever and movable therewith to a plurality of positions whereby right turn, left turn and hazard warning signals may be selectively activated;
said movable electrical contact means comprising a pair of spaced contact plates, said contact plates being electrically insulated from each other and formed with electrical contact buttons, said electrical contact buttons selectively engaging various portions of said stationary contact means as said lever is moved toward its first and second positions and to its extended position.

10. In a turn signal and hazard warning electrical switch device for use in a vehicle having a steering column the combination comprising:
a switch casing secured externally to the steering column, said casing being constructed of electrically non-conductive material;
means defining a cavity extending through said casing for receiving one end of a switch actuating lever therein;
a switch actuating lever extending into said cavity means and rotatable therein between first and second positions about a pivotal axis adjacent the end thereof disposed within said casing when in a normal position, said lever being constructed of electrically non-conductive material;
a plurality of spaced and stationary electrical switch contact means attached to said casing;
a plurality of spaced and movable electrical switch contact means carried by said actuating lever for operatively engaging said stationary electrical contact means and electrically completing various electrical signal circuits, said movable electrical contact means being movable in unison with said lever and capable of being moved into a plurality of positions with respect to said stationary electrical contact means by selectively positioning said lever whereby right turn, left turn and hazard warning signal electrical circuits may be selectively activated;
said movable electrical contact means comprising first and second movable contact plates, said contact plates being spaced from each other and disposed in a plane perpendicular to said pivotal axis of said lever;
said first and second movable contact plates being engageable with said stationary contact means and so arranged with respect thereto that rotation of said lever to its first and second positions will cause only said first movable contact plate to complete right and left turn signal electrical circuits, respectively, and to thereby accomplish lane change or turn signal indications, and
said lever being further bodily movable along its longitudinal axis with respect to said casing to an extended position from its normal position, the longitudinal axis of said lever being perpendicular with respect to said pivotal axis thereof, longitudinal displacement of said lever and said first and second movable contact plates from the lever normal position will cause both the first and the second movable contact plates operatively engage certain of said stationary electrical switch contact means to thereby complete a hazard warning signal electrical circuit.

11. The device of claim 10 wherein
each of said first and second movable contact plates is operatively positionable with respect to certain of said stationary electrical switch contact means to carry a portion only of the total maximum current load the device is designed to handle when said switch lever is in its extended position.

12. The device of claim 10 wherein
said first movable contact plate comprises a substantially triangular shaped first member and includes three electrical contact buttons disposed substantially at each corner thereof;
and said second movable contact plate comprises a triangularly shaped second member which includes three electrical contact buttons disposed so as to define with each other a triangular formation, said first and second members being longitudinally spaced along the longitudinal axis of said switch lever, each of said contact buttons being in abutting engagement with a respective one of said stationary electrical switch contact means when said switch lever is in its extended position, and each pair of contact buttons and switch contact means in abutting engagement being required to carry a portion only of the total maximum current load the device is designed to handle.

* * * * *